US006161423A

United States Patent [19]

Okuma

[11] Patent Number: 6,161,423

[45] Date of Patent: Dec. 19, 2000

[54] APPARATUS AND METHOD FOR DIAGNOSING LEAKS OF FUEL VAPOR TREATMENT UNIT

[75] Inventor: Shigeo Okuma, Atsugi, Japan

[73] Assignee: Unisia Jecs Corporation, Atsugi, Japan

[21] Appl. No.: 09/268,667

[22] Filed: Mar. 16, 1999

[30] Foreign Application Priority Data

Mar. 20, 1998 [JP] Japan .................................. 10-071529
Jun. 10, 1998 [JP] Japan .................................. 10-162055

[51] Int. Cl.$^{7}$ .......................... F02M 33/02; F02M 37/04; G01M 3/32; G01M 15/00

[52] U.S. Cl. ............................ 73/40; 73/49.7; 73/40.5 R; 73/118.1; 123/520

[58] Field of Search ............................ 73/40, 49.7, 49.1, 73/40.5 R, 118.1; 123/520

[56] References Cited

U.S. PATENT DOCUMENTS 5,408,866 4/1995 Kawamura et al. ........................ 73/40
5,467,641 11/1995 Williams et al. ........................ 73/49.7
5,606,121 2/1997 Blomquist et al. .................... 73/118.1
5,726,354 3/1998 Nomura et al. ........................ 73/118.1
5,739,421 4/1998 Iochi et al. ................................ 73/49.7
5,750,888 5/1998 Matsumoto et al. ................... 73/118.1
5,767,395 6/1998 Goto et al. ............................. 73/118.1
5,786,531 7/1998 Lewis et al. .............................. 73/116
5,817,925 10/1998 Cook et al. ................................. 73/40
5,898,108 4/1999 Mieczkowski et al. ............... 73/118.1
5,941,927 8/1999 Pfitz ....................................... 701/102

FOREIGN PATENT DOCUMENTS 5-215020 8/1993 Japan .

*Primary Examiner*—Hezron Williams
*Assistant Examiner*—J. David Wiggins
*Attorney, Agent, or Firm*—Foley & Lardner

[57] ABSTRACT

A leak diagnosis apparatus and method for a fuel vapor treatment unit where fuel vapor produced in a fuel tank is collected by adsorbing into an adsorption canister and the fuel vapor collected in the adsorption canister is purged under predetermined engine operating conditions and supplied to an engine. The diagnosis apparatus includes a leak diagnosis device unit for diagnosing the presence of fuel vapor leaks by comparing a drive load of an electric pump for when air is pumped by the electric pump into a system of fuel piping to be leak diagnosed with a set judgement level of drive load threshold. A fuel temperature detection device is provided for detecting the temperature of fuel, wherein a fuel vapor leak is deemed to exist when the comparisons show that the drive load of the electric pump is less than the set judgement level. A judgement level setting device is provided for setting the judgment level based on the detected temperature.

19 Claims, 5 Drawing Sheets

FIG.7

| FUEL TEMPERATURE (°C) | KTEMP |
|---|---|
| −40 | 7 |
| −10 | 3 |
| 0 | 0 |
| 30 | 0 |
| 40 | −5 |
| 50 | −10 |
| 60 | −15 |
| 100 | −20 |

APPARATUS AND METHOD FOR DIAGNOSING LEAKS OF FUEL VAPOR TREATMENT UNIT

BACKGROUND OF THE INVENTION

1. Field of the Invention

The present invention relates to apparatus and method for diagnosing leaks of a fuel vapor treatment unit of a vehicle internal combustion engine, for diagnosing the presence of leaks in piping.

2. Description of the Related Art

With conventional fuel vapor treatment units for vehicle internal combustion engines, the fuel vapor produced in the fuel tank etc. is temporarily adsorbed in a canister. Then under predetermined engine operating conditions, the adsorbed fuel vapor is de-adsorbed and drawn into the engine intake system, thereby preventing evaporation of the fuel vapor into the atmosphere (refer to Japanese Unexamined Patent Publication No. 5-215020).

With the above unit however, if a crack occurs along the piping, or a fault occurs in a seal at a piping connection, then some of the fuel vapor from the leaking portion will evaporate into the atmosphere, so that the original evaporation prevention effect cannot be fully realized.

Therefore, a leak diagnosis apparatus has been disclosed in Japanese Unexamined Patent Publication No. 7-139439 which confines the negative intake pressure of the internal combustion engine inside the piping and then diagnoses the presence of leaks based on a change in pressure in the piping.

However, with an apparatus for diagnosing the presence of leaks in this manner based on a change in pressure, there is the problem that in the case of minute holes in the piping where the amount of leakage is small, it is difficult to diagnose with high accuracy.

SUMMARY OF THE INVENTION

The present invention takes into consideration such heretofore problems, with the object of providing apparatus and method for diagnosing leaks of a fuel vapor treatment unit, which can diagnose at a high accuracy even with a small amount of leakage, and which can avoid an influence on leak diagnosis due to fuel temperature, to thereby improve diagnosis accuracy.

Furthermore, it is an object to provide apparatus and method for diagnosing leaks of a fuel vapor treatment unit, which can diagnose at a high accuracy even with a small amount of leakage, and which can infallibly avoid an influence on leak diagnosis due to residual pressure or residual fuel vapor in the piping.

With apparatus and method for diagnosing leaks of a fuel vapor treatment unit according to the present invention for achieving the above objects, the construction is such that the presence of fuel vapor leaks is diagnosed by comparing a drive load of an electric pump for when air is pumped by the electric pump into piping to be leak diagnosed of the fuel vapor treatment unit, with a judgment level,. Moreover, the judgment level is set based on the temperature of fuel.

With such a construction, air is pumped by the electric pump (air pump) into the piping to be leak diagnosed, and the drive load (drive current) of the electric pump at this time is compared with the judgment level set based on the temperature of fuel, to thereby diagnose the presence of fuel vapor leaks. More specifically, when the drive load (drive current) of the electric pump is less than the judgment level, it is diagnosed that a leak has occurred.

In this way, in the case where the drive load of the electric pump increases as a result of an increase in the pressure inside the piping due to fuel vapor from high temperature fuel, the judgment level is corrected corresponding to this, enabling the influence on the leak diagnosis due to fuel temperature to be avoided, ensuring high diagnosis accuracy. Furthermore, in the case where, under a low fuel temperature environment with the temperature of the electric pump also low so that the drive efficiency of the electric pump is reduced, the judgment level is corrected corresponding to this, enabling the influence on the leak diagnosis due to fuel temperature to be avoided, ensuring high diagnosis accuracy.

Here, the construction is preferably such that the drive load of the electric pump is obtained beforehand for when the air pumped by the electric pump leaks via a reference orifice having a reference aperture diameter, and the judgment level is set based on the drive load and fuel temperature.

With such a construction, the air pumped by the electric pump is discharged to the atmosphere via a reference orifice of an aperture diameter corresponding to a leak area which becomes the reference, to thereby obtain the drive load of the electric pump for the reference leak area. The judgment level to be used for the actual leak diagnosis can then be set with this as the reference. Furthermore, by adding to the judgment level a correction corresponding to the fuel temperature, then the influence on leak diagnosis due to fuel temperature can be avoided.

Moreover, the construction may involve estimating the fuel temperature to be used in setting the judgment level, from the outside air temperature, or from detection results of intake air temperature of the internal combustion engine.

With such a construction, for example, the fuel temperature can be estimated by appropriating an outside air temperature sensor provided for temperature adjustment of the vehicle air-conditioning, or by appropriating an intake air temperature sensor provided for correcting fuel injection quantity.

Preferably the construction involves scavenging, prior to leak diagnosis, by feeding air using the electric pump into the piping to be leak diagnosed of the fuel vapor treatment unit.

With such a construction, since prior to leak diagnosis the piping to be leak diagnosed is scavenged, then residual pressure and residual gas which can influence the pressure condition inside the piping are removed beforehand, enabling diagnosis to be accurately effected by the drive load of the electric pump.

Here the construction preferably involves changing the time of the scavenging, corresponding to the temperature of the fuel.

With such a construction, prior to leak diagnosis, scavenging is effected to remove residual pressure and residual gas. However the time of the scavenging is changed depending on fuel temperature which is correlated with the residual gas quantity, so that scavenging is carried out for only just enough time to remove the residual pressure and residual gas.

Moreover, with the apparatus and method for diagnosing leaks of a fuel vapor treatment unit according to the present invention for achieving the above objects, the construction includes, scavenging for a scavenge time corresponding to the temperature of the fuel, by feeding air using an electric pump into the piping to be leak diagnosed of the fuel vapor treatment unit, and after completion of the scavenging, obtaining the drive load of the electric pump for when the air is pumped to inside the piping by the electric pump, and comparing the drive load with a judgment level, to thereby diagnose the presence of fuel vapor leaks.

With such a construction, when the air is pumped to inside the piping by the electric pump, if there is a leak, then the drive load of the electric pump is reduced. Hence the presence of leaks can be diagnosed by the magnitude of the drive load. Here, prior to leak diagnosis, scavenging is effected to remove residual pressure and residual gas. However the time of the scavenging is changed depending on fuel temperature which is correlated with the residual gas quantity, so that scavenging is carried out for only just enough time to remove the residual pressure and residual gas Here, the construction preferably involves obtaining beforehand the drive load of the electric pump for when the air pumped by the electric pump leaks via a reference orifice having a reference aperture diameter, and setting the judgment level based on the drive load.

With such a construction, the air pumped by the electric pump is discharged to the atmosphere via a reference orifice of an aperture diameter corresponding to a leak area which becomes the reference, to thereby obtain the drive load of the electric pump for the reference leak area. The judgment level to be used for the actual leak diagnosis can then be set with this as the reference.

Moreover, the construction may involve estimating the fuel temperature to be used in setting the scavenge time, from the outside air temperature, or from detection results of intake air temperature of the internal combustion engine.

With such a construction, for example, the fuel temperature can be estimated by appropriating an outside air temperature sensor provided for temperature adjustment of the vehicle air-conditioning, or by appropriating an intake air temperature sensor provided for correcting fuel injection quantity.

Other objects, and aspects of the present invention will become apparent from the following description of embodiments given in conjunction with the appended drawings.

BRIEF DESCRIPTION OF THE DRAWINGS

FIG. 7 is a characteristic map showing a relation between fuel temperature and correction value KTEMP, used in another embodiment.

DESCRIPTION OF THE PREFERRED EMBODIMENT

As follows is a description of an embodiment of the present invention.

Figure 1:
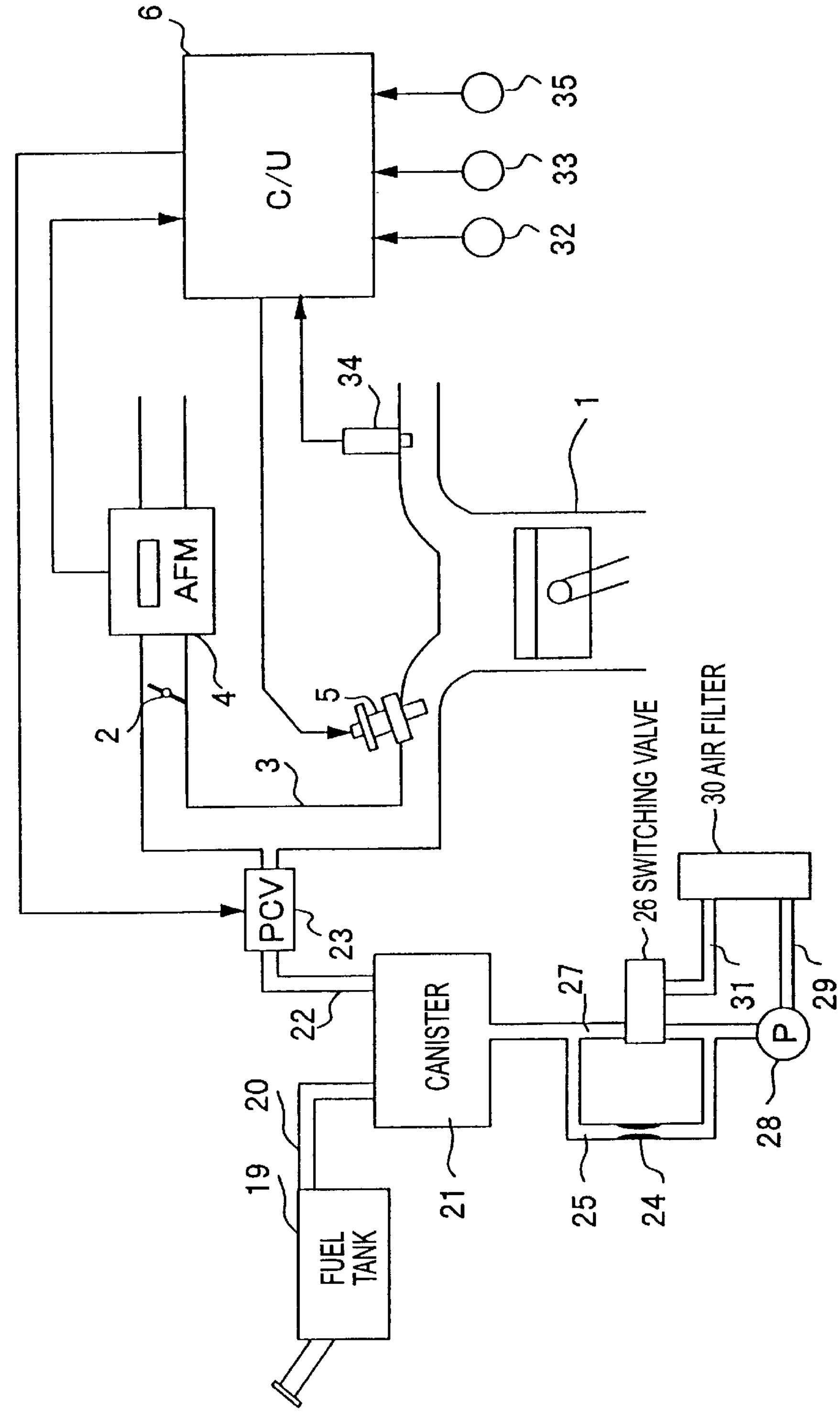
FIG. 1 is a diagram showing the system structure of an embodiment of the present invention.

In FIG. 1 showing the embodiment, air is drawn into a vehicle internal combustion engine 1 via an intake air passage 3 in which is disposed a throttle valve 2 linked to an accelerator pedal (not shown in the figure).

An air flow meter 4 for detecting an intake air quantity which is flow controlled by the throttle valve 2, is disposed upstream of the intake air passage 3, and solenoid type fuel injection valves 5 are provided for each cylinder, in a downstream section (manifold section) of the intake air passage 3, for injecting fuel pumped from a fuel pump (not shown in the figure) and controlled to a predetermined pressure by a pressure regulator, into the intake air passage 3. Control of the fuel injection quantity from the fuel injection valves 5 is performed by a control unit 6 incorporating a microcomputer.

Furthermore, the engine 1 is provided with a fuel vapor treatment unit. The fuel vapor treatment unit adsorbs and collects fuel vapor produced in a fuel tank 19, in an absorption material (absorption device) such as activated carbon filled into a canister 21, by way of a fuel vapor introducing passage 20. The fuel absorbed in the absorption material is then supplied to the intake air passage 3 on the downstream side of the throttle valve 2 via a purge passage 22, together with fresh air, using the negative intake pressure of the engine 1.

In the purge passage 22 is disposed a solenoid operated purge control valve (PCV) 23 which is controlled based on a control signal from the control unit 6.

For leak diagnosis of the fuel vapor in the fuel vapor treatment unit, the following piping system is constructed.

That is to say, an electric pump (air pump) 28 is connected to an air introduction port opened at a lower portion of the canister 21, by means of a first passage 25 in which is disposed a reference orifice 24 of a reference aperture diameter, for example 0.5 mm aperture diameter, and a second passage 27 connected in parallel with the first passage 25 by way of one port of a switching valve 26. An air introduction passage 29 connected to the intake port of the electric pump 28 introduces air via an air filter 30. An air discharge passage 31 is connected to the other port of the switching valve 26.

The switching valve 26 is switched between a condition where the other port to which the air discharge passage 31 is connected, is communicated with the second passage 27 which leads to the air introduction port of the canister 21, and air discharged from the air discharge passage 31 is discharged to the atmosphere via the air filter 30, and a condition where the second passage 27 is opened via the one port so that the electric pump 28 and the air introduction port of the canister 21 are communicated via the second passage 27.

Moreover, there is provided a rotational speed sensor 32 for detecting an engine rotational speed N, a water temperature sensor 33 for detecting water temperature Tw, an air-fuel ratio sensor 34 for detecting air-fuel ratio based for example on oxygen concentration in the exhaust, and a fuel temperature sensor 35 for detecting fuel temperature inside the fuel tank 19. Detection signals from these sensors are output to the control unit 6.

The control unit 6 controls the fuel injection quantity from the fuel injection valves 5, based on signals from the respective sensors, and under predetermined operating conditions, controls to open the purge control valve 23 to effect processing for purging the fuel vapor into the intake system, and under predetermined conditions effects leak diagnosis according to the present invention.

A fuel vapor leak diagnosis routine carried out by the control unit 6 for such a construction will be explained in accordance with the flow chart of FIG. 2.

In step S1, it is judged if predetermined leak diagnosis conditions have materialized. Here these leak diagnosis conditions are preferably when the engine is stopped, and it is diagnosed in a separately executed fault diagnosis routine that the purge control valve 23 is normal.

When judged in step S1 that the leak diagnosis conditions have materialized, control proceeds to step S2 (scavenge time change device) to set the time (scavenge time) for executing processing for scavenging the fuel vapor inside the piping.

Figure 2:
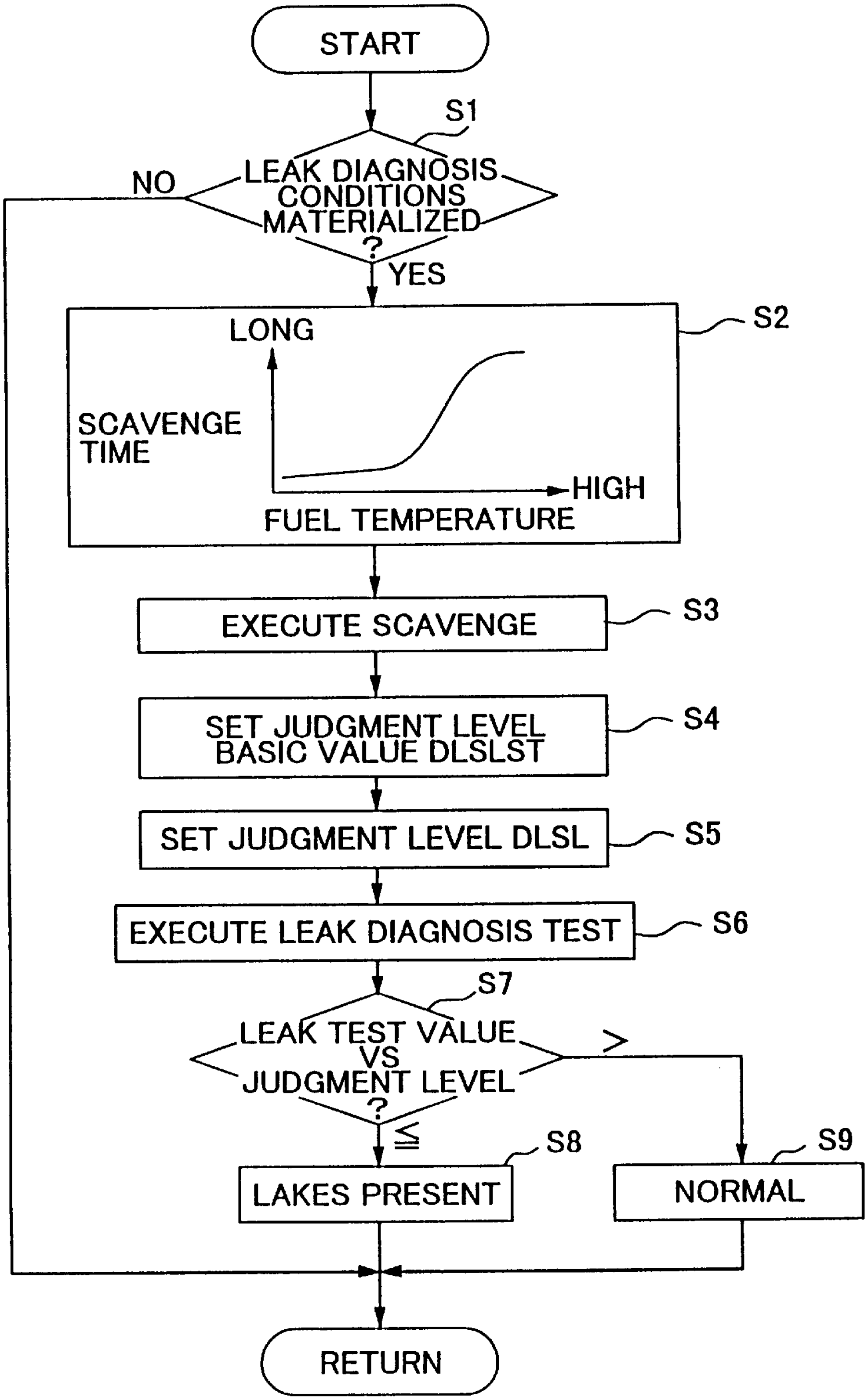
FIG. 2 is a flow chart showing a leak diagnosis routine of the embodiment.

The scavenge time, as shown in FIG. 2, is longer when estimated that the fuel temperature when detected by the fuel temperature sensor 35 (fuel temperature detection device) is higher and hence the amount of fuel vapor generated is large. As a result, the removal of residual pressure (negative pressure) and residual gas by scavenging can be reliably effected, and an increase in leak diagnosis time due to scavenging being effected for longer than necessary can be avoided.

When the fuel temperature is high, the scavenging can be carried out several times at intervals. Furthermore, when sufficient time has elapsed since stopping the engine, the outside air temperature or the engine intake air temperature will have a constant correlation with the fuel temperature. Hence the construction may be such that the fuel temperature is estimated from the outside air temperature detected by an outside air temperature sensor or from an intake air temperature detected by an intake air temperature sensor.

Once the scavenge time has been set in step S2, control proceeds to step S3 (scavenge device) to execute actual processing for scavenging the fuel vapor inside the piping.

More specifically, the purge control valve 23 is opened, the one port of the switching valve 26 is closed, the other port is opened, and the electric pump 28 is driven by applying a constant voltage thereto.

Figure 3:
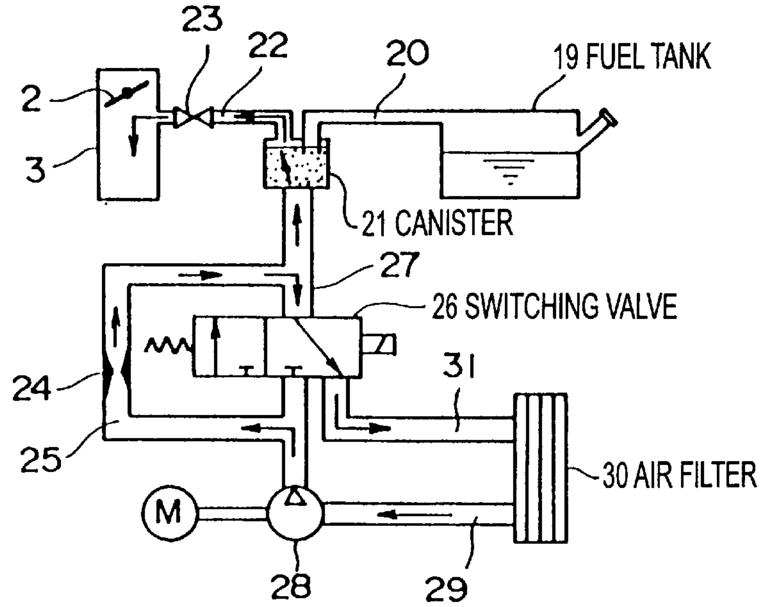
FIG. 3 is a diagram showing the flow of air at the time of scavenging, in the embodiment.

At this time, as shown in FIG. 3, due to operation of the electric pump 28, air introduced via the air filter 30 and the air introduction passage 29 passes via the first passage 25 through the canister 21 and is discharged into the intake air passage 3 via the purge passage 22. Furthermore, a part of the air passes from the switching valve 26 via the air discharge passage 31 and the air filter 30 and is discharged into the atmosphere. As a result, the residual pressure (negative pressure) and residual gas inside the purge passage 22 is scavenged and thus eliminated.

Then in step S4, a basic value DLSLST of the leak diagnosis judgement level is determined. More specifically, the purge control valve 23 is closed, the one port of the switching valve 26 is closed, the other port is opened, and the electric pump 28 is driven, and this condition is maintained for a predetermined time.

Figure 4:
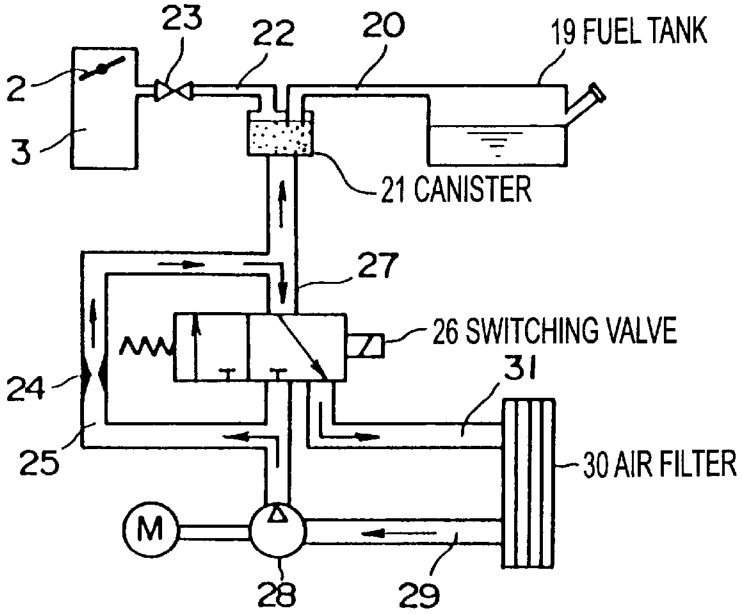
FIG. 4 is a diagram showing the flow of air at the time of setting a judgment level, in the embodiment.

At this time, as shown in FIG. 4, due to operation of the electric pump 28, air introduced via the air filter 30 and the air introduction passage 29, passes via the first passage 25 and is discharged to the atmosphere from the switching valve 26 via the air discharge passage 31 and the air filter 30.

Under these conditions, the drive current (drive load) of the electric pump 28 is detected, and this current value is set as the basic value DLSLST of the judgement level. That is to say, the drive current (drive load) of the electric pump 28 for when the air passes through the reference orifice 24 of the reference aperture diameter is detected.

Figure 6:
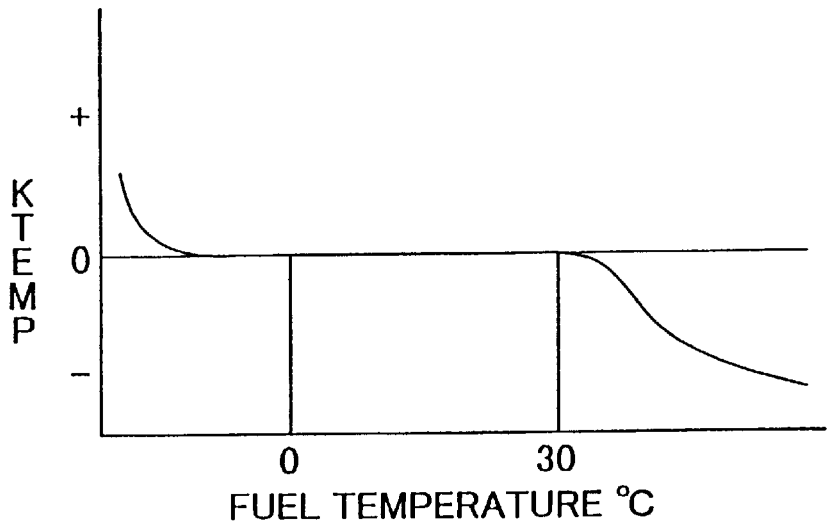
FIG. 6 is a characteristic map showing a relation between fuel temperature and correction value KTEMP, used in the embodiment.

Then, in step S5, the basic value DLSLST of the judgment level is corrected in accordance with the fuel temperature, to set a final judgment level DLSL judgment level setting device). More specifically, a correction value KTEMP for the judgment level is looked up from a characteristic map as shown in FIG. 6, and the judgment level DLSL then computed from the following equation:

$$DLSL=DLSLST-KTEMP$$

Here, the correction value KTEMP is set to zero without a practical correction when the fuel temperature is within a predetermined range (for example 0° ~30° C.), while when the temperature exceeds 30° C., the correction value KTEMP is set to a negative value. Furthermore, at the time of low temperatures less than 0° C., this is set to a positive value. Consequently, at the time of high temperatures above the fuel temperature setting range, the judgment level DLSL is increasingly corrected, while at the time of low temperatures below the setting range, the judgment level DLSL is reducingly corrected.

In step S6, leak diagnosis test is executed. More specifically, the purge control valve 23 is closed, the other port of the switching valve 26 closed and the one port is opened, and the electric pump 28 is driven, and this condition is maintained for a predetermined time.

Figure 5:
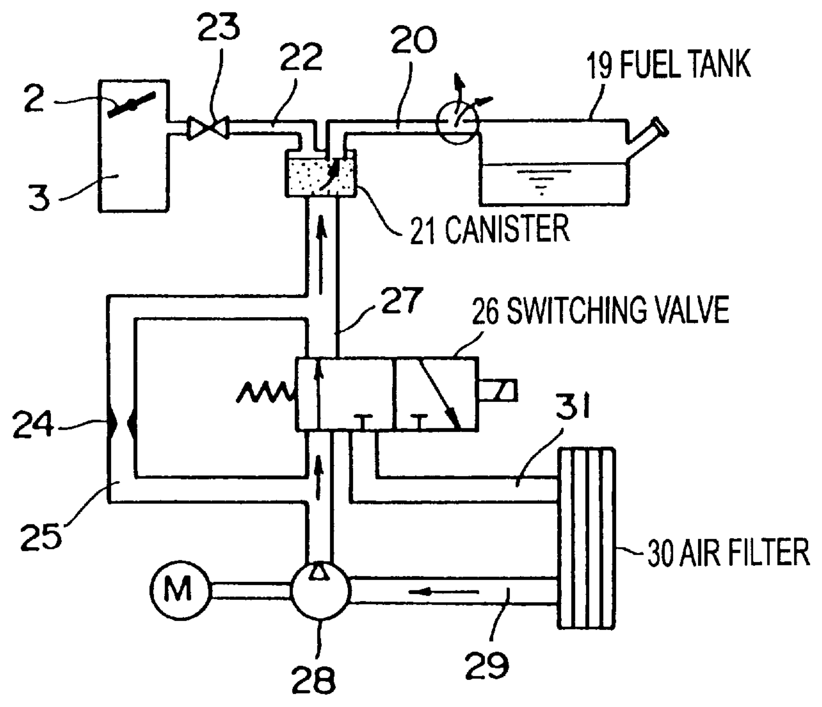
FIG. 5 is a diagram showing the flow of air at the time of executing leak diagnosis test in the embodiment.

At this time, as shown in FIG. 5, due to operation of the electric pump 28, air introduced via the air filter 30 and the air introduction passage 29 passes via the second passage 27 through the canister 21 and flows into the fuel vapor introduction passage 20 and the purge passage 22 reaching from the fuel tank 19 to the purge control valve 23.

Under this condition, the drive current for the electric pump 28 is detected.

In step S7, the drive current detected in step S6 is compared with the judgment level DLSL computed in step S5, to effect fuel vapor leak diagnosis.

That is to say, when judged that the drive current is equal to or below the judgment level, control proceeds to S8 thus diagnosing that a leak has occurred, while when judged that the drive current is greater than the judgment level DLSL control proceeds to step S9, thus diagnosing that a leak has not occurred.

The sections of step S7 through step S9 corresponds to the leak diagnosis device.

In this way, basically, in the case where the drive current of the electric pump 28 at the time of leak diagnosis testing is smaller than the drive current required to pass the air through the reference orifice 24 having the reference aperture diameter, that is to say in the case where the drive current of the electric pump 28 is reduced, it is diagnosed that a crack equivalent to the opening up of a hole larger then the reference aperture diameter has occurred in the fuel vapor introduction passage 20, or the purge passage 22, producing a leak greater than a set level, while in other cases, it is diagnosed that there is no leak (normal).

Here, in the case where the drive current increases due to high fuel temperature and hence an increase in fuel vapor pressure, or in the case where under a low fuel temperature environment where the electric pump temperature is also low, the drive efficiency of the fuel pump is reduced, then as mentioned before the correction value KTEMP is used to effect a correction to reduce or increase the judgment level DLSL, thereby avoiding the influence on the leak diagnosis due to these fuel temperatures, and ensuring a high diagnosis accuracy.

The construction may be such that instead of the characteristic map shown in FIG. 6, the correction value KTEMP is looked up from a table as shown in FIG. 7.

What we claimed are:

1. A leak diagnosis apparatus for a fuel vapor treatment unit where fuel vapor produced in a fuel tank is collected by adsorbing into an adsorption means, and the fuel vapor collected in the adsorption means is purged under predetermined engine operating conditions and supplied to an engine, said leak diagnosis apparatus comprising:

leak diagnosis means for diagnosing the presence of fuel vapor leaks by comparing a drive load of an electric pump for when air is pumped by said electric pump into a system of fuel piping of said fuel vapor treatment unit to be leak diagnosed, with a set judgement level of drive load threshold, wherein the set iudgement level is higher for higher fuel temperatures, fuel temperature detection means for detecting the temperature of fuel, wherein a fuel vapor leak is deemed to exist when the comparisons show that the drive load of the electric pump is less than the set judgement level, and judgement level setting means for setting said judgment level based on the detected temperature.

2. A leak diagnosis apparatus for a fuel vapor treatment unit according to claim 1, wherein said judgment level setting means:

detects the drive load of said electric pump at a reference leak condition for when the air pumped by said electric pump leaks via a reference orifice having a reference aperture diameter, and sets said judgment level based on said drive load and said detected temperature of the fuel.

3. A leak diagnosis apparatus for a fuel vapor treatment unit according to claim 1, wherein said fuel temperature detection means estimates the fuel temperature by detecting an outside air temperature, or an intake temperature of the internal combustion engine.

4. A leak diagnosis apparatus for a fuel vapor treatment unit according to claim 1, further comprising scavenging means for scavenging prior to leak diagnosis with said leak diagnosis means, by feeding air using said electric pump into the piping to be leak diagnosed.

5. A leak diagnosis apparatus for fuel vapor treatment unit according to claim 4, further comprising scavenge time change means for changing the time of scavenging by said scavenging means, corresponding to the temperature of the fuel detected by said fuel temperature detection.

6. A leak diagnosis apparatus for a fuel vapor treatment unit where fuel vapor produced in a fuel tank is collected by adsorbing into an adsorption means, and the fuel vapor collected in the adsorption means is purged under predetermined engine operating conditions and supplied to an engine, said leak diagnosis apparatus comprising:

leak diagnosis means for diagnosing the presence of fuel vapor leaks by comparing a drive load of an electric pump for when air is pumped by said electric pump into a system of fuel piping to be leak diagnosed of said fuel vapor treatment unit, with a judgement level, scavenging means for scavenging prior to leak diagnosis with said leak diagnosis means, by feeding air using said electric pump into the piping to be leak diagnosed of said fuel vapor treatment unit, fuel temperature detection means for detecting the temperature of fuel, wherein a fuel vapor leak is deemed to exist when the comparisons show that the drive load of the electric pump is less than the set judgement level, scavenge time change means for changing a time of scavenging by said scavenging means, corresponding to the temperature of the fuel detected by said fuel temperature detection means, and judgment level setting means for setting said judgment level based on the temperature of the fuel.

7. A leak diagnosis apparatus for a fuel vapor treatment unit according to claim 6, wherein said judgment level setting means detects the drive load of said electric pump at a reference leak condition for when the air pumped by said electric pump leaks via a reference orifice having a reference aperture diameter, and sets said judgment level based on said drive load.

8. A leak diagnosis apparatus for a fuel vapor treatment unit according to claim 6, wherein said fuel temperature detection means estimates the fuel temperature by detecting an outside air temperature, or an intake temperature of the internal combustion engine.

9. A leak diagnosis method for a fuel vapor treatment unit where fuel vapor produced in a fuel tank is collected by adsorbing into an adsorption means, and the fuel vapor collected in the adsorption means is purged under predetermined engine operating conditions and supplied to an engine, comprising:

detecting a drive load of an electric pump for when air is pumped by said electric pump into a system of fuel piping to be leak diagnosed of said fuel vapor treatment unit, and comparing said drive load with a judgment level set based on said drive load and the temperature of fuel, to thereby diagnose the presence of leaks of fuel vapor, wherein said set judgement level of the drive load threshold is higher for higher fuel temperatures, and wherein a fuel vapor leak is deemed to exist when the comparisons show that the drive load of said electric pump is less than said set judgement level.

10. A leak diagnosis method for a fuel vapor treatment unit according to claim 9, further comprising:

detecting the drive load of said electric pump at a reference leak condition for when the air pumped by said electric pump leaks via a reference orifice having a reference aperture diameter, and setting said judgment level based on said drive load and said detected temperature of the fuel.

11. A leak diagnosis method for a fuel vapor treatment unit according to claim 9, further comprising:

setting the fuel temperature by detecting an outside air temperature, an intake temperature of the internal combustion engine.

12. A leak diagnosis method for a fuel vapor treatment unit according to claim 9, further comprising:

performing scavenging prior to leak diagnosis, by feeding air using said electric pump into the piping to be leak diagnosed.

13. A leak diagnosis method for a fuel vapor treatment unit according to claim 12, further comprising:

changing the time of said scavenging corresponding to the temperature of the fuel, wherein the time of scavenging is set longer when the fuel temperature is higher.

14. A leak diagnosis method for a fuel vapor treatment unit where fuel vapor produced in a fuel tank is collected by adsorbing into an adsorption means, and the fuel vapor collected in the adsorption means is purged under predetermined engine operating conditions and supplied to an engine, comprising:

performing scavenging for a scavenge time corresponding to a temperature of the fuel, by feeding air using an electric pump into a system of fuel piping of said fuel vapor treatment unit to be leak diagnosed, after completion of said scavenging, detecting the drive load of said electric pump for when the air is pumped to inside the piping by said electric pump, and comparing said drive load with a judgment level, to thereby diagnose the presence of fuel vapor leaks.

15. A leak diagnosis method for a fuel vapor treatment unit according to claim 14, further comprising:

detecting a drive load of said electric pump at a reference leak condition for when the air pumped by said electric pump leaks via a reference orifice having a reference orifice having a reference diameter, and setting said judgment level based on said drive current.

16. A leak diagnosis method for a fuel vapor treatment unit according to claim 14, further comprising:

estimating the fuel temperature from an outside air temperature, or an intake temperature of the internal combustion engine.

17. The leak diagnosis apparatus according to claim 5, wherein the time of scavenging is set longer when the fuel temperature is higher.

18. The leak diagnosis apparatus according to claim 6, wherein the time of scavenging is set longer when the fuel temperature is higher.

19. A leak diagnosis method for a fuel vapor treatment unit according to claim 14, wherein the time of scavenging is set longer when the fuel temperature is higher.

* * * * *